United States Patent Office 3,792,134
Patented Feb. 12, 1974

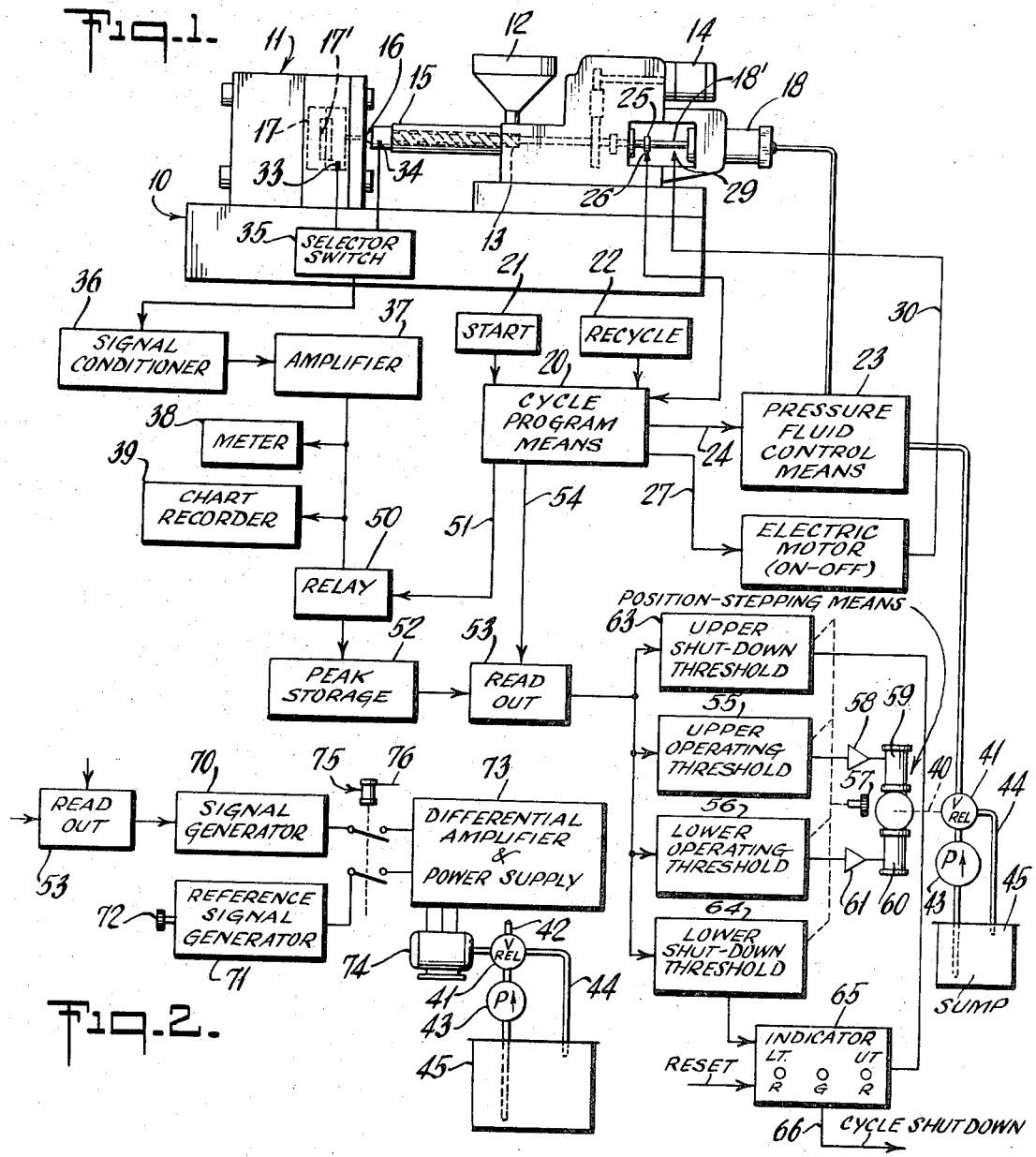

3,792,134
METHOD FOR MONITORING PRODUCT QUALITY IN A PLASTICS INJECTION-MOLDING MACHINE
Donald C. Paulson, Southington, Conn., assignor to Litton Industrial Products, Inc.
Original application July 15, 1969, Ser. No. 841,719, now Patent No. 3,628,901, dated Dec. 21, 1971. Divided and this application Oct. 15, 1970, Ser. No. 81,042
Int. Cl. B29f 1/00
U.S. Cl. 264—40
2 Claims

ABSTRACT OF THE DISCLOSURE

The invention contemplates control of quality and consistency in products of recycled operation of a plastics injection-molding machine by observing, for each cycle of operation, the peak pressure of plasticized melt and by comparing the observed value against a reference value. The polarity and magnitude of difference between observed and reference values are utilized to effect corrective adjustment on the feed force operative on plasticized melt on a succeeding cycle of the machine. If desired, means responsive to detected inability to effect adequate correction may automatically shut down the machine and indicate the polarity of the failure.

---

This application is a division of my copending United States application Ser. No. 841,719, filed July 15, 1969, now U.S. Pat. No. 3,628,901.

This invention relates to a method for monitoring quality of products of recycled operation of plastics injection-molding machines.

Machines of the character indicated utilize reciprocating mechanism to achieve feed or discharge of plastic melt into a given mold, but in spite of all the care taken to control the power behind the feed stroke, a myriad of factors exist to change the quality of a given molded product, as between different injection strokes. For example, variations in heat control or heat dissipation in the plasticizing mechanism can affect viscosity of the melt and hence the rate at which a given feed force or pressure will be operative to fill the mold. Moreover, any interruption in the recycling pace of the machine will upset the heat-flow pattern of distribution throughout the machine, with resultant change in viscosity of discharged melt. No single machine to date has been built with the sophistication needed to account for all the variables involved; neither is it certain that all the variables have yet been identified and explained in their relation to each other. To provide and maintain a machine which could respond to all the variables thus far identified would indeed be prohibitively expensive and cumbersome. Attempts to monitor product quality by observing total injection-stroke time rest on a misleading and often erroneous assumption that the rate profile over the full stroke will repeat itself. As a matter of fact, significant degradation of product quality can be traced to anomalies occurring variously in the injection stroke, from one stroke to a succeeding stroke.

It is, accordingly, an object of the invention to provide an improved plastics injection-molding machine incorporating the monitoring of a selected variable which has been found to significantly affect product quality.

A specific object is to provide simple means to monitor pressure of plastic melt over a preselected portion of the operative cycle, in a machine of the character indicated.

More specifically, it is an object to provide means whereby peak pressure of plasticized melt may be monitored and periodically evaluated against a preselected level, representative of the pressure known to have produced a given quality product.

A further object is to achieve the above objects with means which automatically establishes a corrective control adjustment operative to modify the injection force developed in succeeding cycles of the machine.

A still further object is to achieve the above objects with automatic means for indicating failure of the corrective adjustment and, if desired, for shutting down the machine for failure to make adequate corrective adjustment.

It is a general object to meet the above objects with relatively simple mechanism which may be readily attached or adapted to existing machines, and which will permit flexibility of set-up, particularly as to the range of peak pressures selectable for the desired control action.

Another general object is to provide relatively simple mechanism for substantially improving the operating efficiency of a machine of the character indicated, and for reducing the waste of machine time and of plastics material that results from unwitting manufacture of products of inferior quality.

Other objects and features of the invention will be pointed out or will occur to those skilled in the art from a reading of the following specification in conjunction with the accompanying drawings. In said drawings, which show, for illustrative purposes only, preferred embodiments of the invention:

FIG. 1 is a simplified schematic diagram illustrating pressure monitoring and control means of the invention in application to a plastics injection-molding machine;

FIG. 2 is a fragmentary diagram similar to FIG. 1 to illustrate alternative mechanism for a part of the organization of FIG. 1; and FIG. 3 is a graph depicting several illustrative time-varying functions in a typical cycle of operation of the machine of FIG. 1.

Briefly stated, the invention contemplates control of quality and consistency in products of recycled operation of a plastics injection-molding machine by observing, for each cycle of operation, the peak pressure of plasticized melt and by comparing the observed value against a reference value. The polarity and magnitude of difference between observed and reference values are utilized to effect corrective adjustment of the feed force operative on plasticized melt on a succeeding cycle of the machine. If desired, means responsive to detected inability to effect adequate correction may automatically shut down the machine and indicate the polarity of the failure.

Referring to FIG. 1 of the drawings, the invention is shown in application to a plastics injection-molding machine of the reciprocating-screw variety, comprising an elongated bed or frame 10 supporting mold-clamp mechanism 11 at one end, and plasticizing and injection means at the other end. Material to be plasticized is introduced in a hopper 12 and is gravity-fed to a rearward part of an elongated plasticizing screw 13, rotated by motor means 14 having geared connection to a splined rearward region of screw 13. The direction of screw rotation within its confining barrel 15 is such as to accomplish plasticizing action while advancing the plastics material toward the front (or nozzle) end of barrel 15. A nozzle 16 is shown at the front end of barrel 15 and will be understood to be engaged to the sprue hole or inlet port to a mold 17 clamped by means 11.

The screw 13 is reciprocable on its axis and is forwardly loaded by hydraulic means 18. Plasticized melt accumulates forward of the screw and forces the retraction of the screw until such time as an adequate shot size has been prepared, whereupon motor 14 is stopped, and, when the mold cavity 17′ has been cleared (of the previously molded product) and is otherwise in readiness, the feed stroke may proceed under the driving action of hydraulic means 18 on the screw 13. The forward (injected) position is held, as necessary, to permit setting and curing of the molded product; and the described plasticizing process may be repeated, in preparation for the next shot, while curing proceeds for the most recent shot.

For simplicity of presentation, the conventional parts of the control mechanism are only very schematically shown. Basically, cycle program means 20 includes provision at 21 for manual start and at 22 for automatically recycled operation; the designation 22 will be understood to include various safety interlocks (not shown) which certify inter alia that the clamp mechanism 11 has been properly reset after removal of the previously molded product from cavity 17'. Upon recycled start of the program means 20, the screw 13 is in its rear position in readiness for a feeding displacement to the forward position shown in FIG. 1, thus discharging a shot of plasticized melt via nozzle 16 to fill the cavity 17'. For this purpose, hydraulic feed means 18 receives a supply of pressure fluid from a suitable control means 23, as governed by a control connection 24 from program means 20. Having reached the forward position shown, a lug 25 carried by the piston rod 18' of hydraulic feed means 18 intercepts and actuates a frame-based limit switch 26 to initiate in program means 20 a timed dwell for maintenance of strong hydraulic feed pressure at 18 during the "holding phase," to permit product-curing under pressure. When this dwell is timed out, the program means 20 is operative (via line 24) to establish a substantially lowered "loading" pressure in the line to hydraulic means 18 and (via line 27) to pick up a relay 28 for re-starting motor 14. A new charge of melt in generated as screw 13 retreats, until lug 25 is intercepted by a second limit switch 29; a connection 30 from switch 29 is then operative to disable the motor relay 28 and to shut down motor 14, while clamp 11 is opened for molded-product removal.

The monitoring mechanism of the invention involves tracking, against a predetermined reference level, the observed peak pressure of the plasticized melt. While this is preferably done by suitable transducer means 33 carried by mold 17 and exposed for pressure response at the inner wall of cavity 17' (preferably, near the forward or sprue end thereof), I show in FIG. 1 another pressure transducer 34 carried at the forward end of barrel 15 (or by nozzle 16) and exposed for pressure reponse in the accumulated-melt region which is always forward of the screw 13. A selector switch 35 is shown accepting the output responses of both transducer 33-34, for connection of the selected pressure-response signal to suitable signal-conditioning means 36. The selected transducer may constitute one arm of an electrical bridge circuit, for which other elements (including suitable bridge-balancing means) may be contained in the signal-conditioning means 36. An amplifier 37 responds to bridge unbalance, which may be directly observed at 38 (as a meter deflection) or at 39 (as a chart recording), both the display devices being calibrated for the transducer-observed pressure level.

In accordance with the invention, the transducer-observed pressure is observed for its peak magnitude during a given machine cycle, and this peak value is observed for the extent, if any, to which it deviates from a predetermined value. The deviation is caused to institute a corrective setting in the force-generating mechanism which utimately determines peak pressure of the plasticized melt. In the hydraulic feed system shown, this correction is effected by mechanical positioning displacement of means 40 forming part of a relief valve 41 in the high-pressure line 42 from source 43 to the pressure-fluid control means 23. The corrected setting will be understood to determine a modified high pressure delivered in line 42, due to venting in line 44 to the sump 45.

As shown, a relay 50 is controlled by an output 51 of the program means 20, to gate amplifier 37 to a peak-storage circuit 52 during the interval of high-pressure supply to hydraulic means 18, i.e., during the injection and/or holding phases of machine operation. The peak magnitude is stored until "read-out" by means 50, upon receipt of a read-out control impulse in output 54 of the program means 20; it will be understood that the read-out function may accomplish discharge of the stored peak voltage at 52, to condition the latter for acceptance of the next peak-storage function. Upper and lower operating threshold circuits 55–56 are connected for response to the signal magnitude read-out at 53. The threshold levels of circuits 55–56 are adjustable, as by the ganged connection shown to a single control knob 57. Normally, the spread between the upper and lower thresholds is wide enough to accommodate normal fluctuations between detected peaks of plastic-melt pressure, but if the upper threshold (at 55) is exceeded for a particular read-out at 53, then a pulse-signal amplifier 58 in the output of threshold circuit 55 is operative to deliver a pulsed excitation of a first of two solenoids 59–60. Solenoids 59–60 will be understood to schematically indicate reversible drive means for incrementally imparting corrective displacements, as by polarized ratcheting or position-stepping, to the relief-setting adjustment means 40. Solenoid 60 is shown connected for response to signal-pulse output of amplifier 61, which may be similar to amplifier 58 but operative only when the signal level read-out at 53 fails to achieve the lower operating threshold at 56. The polarity of connections is such that incremental displacement of the relief setting at 40 is in the sense of reducing the relief pressure at 41 when solenoid 59 is actuated, and is in the sense of elevating the relief pressure at 41 whenever solenoid 60 is actuated.

To complete the identification of parts in FIG. 1, upper and lower shut-down threshold circuits 63–64 are additionally shown connected for response to the peak-storage level, read-out at 53. The ganged connections to knob 57 include control connections for threshold adjustments at 63–64, so that a single adjustment suffices for re-establishment of the threshold-monitored range, as needed. The threshold level at 63 is set above the operating threshold at 55 so that any exceeding of the upper shut-down threshold at 63 may be indicative of failure to accomplish sufficient correction through normal operation of circuits 55–56. In analogous fashion, the threshold level at 64 is set below the operating threshold at 56 so that any failure to achieve the lower shut-down threshold at 64 may be indicative of failure to accomplish sufficient correction through normal operation of circuits 55–56. An indicator 65 has separate input connection from the shut-down circuits 63–64 and may be provided with suitable lamps or other devices to display the existence and general nature of the failure. In the form shown, a central GREEN lamp (labeled "G") is excited as long as neither of the shut-down circuits 63–64 is operated. However, upon failure to achieve sufficient peak presence of the melt, a RED lamp (labeled "R" and "LT," meaning "lower threshold") is illuminated; similarly, upon development of excessive melt pressure, another RED lamp (labeled "R" and "UT," meaning "upper threshold") will be illuminated. An output 66 will be understood to signify supply of a shut-down control signal to the cycle program means 20, whenever either of the described shut-down thresholds at 63–64 is violated.

FIG. 2 illustrates a modification of the control system of FIG. 1, wherein the read-out signal level at 53 is more smoothly tracked, for similarly smoothed positioning control of the relief-valve adjustment means 40. As schematically shown, a signal generator 70 supplies a continuous output signal (e.g., voltage) of level which will be understood to track the most recently observed read-out peek level, available at 53. A reference-signal generator 71, with provision 72 for manual adjustment, supplies a similar continuous output signal (e.g., voltage). The outputs of generators 70–71 are differentially evaluated at 73 to determining the polarity of actuating excitation to a reversible motor 74, which may be of the stalled torque variety. The direction of drive by motor 74 will be understood to raise the pressure-venting setting of valve 41, whenever means 73 detects the output of generator 70 below the reference output level at 71. In similar fashion, motor 74 is driven in the opposite direction to lower the pressure-venting set of valve 41, whenever means 73 detects the output of generator 70 above the reference output level at 71. A sampling relay 75 having separate normally open contacts in the respective outputs of generators 70–71 is briefly operated once per cycle of the machine, as by a suitable control connection 76 to the program means 20; preferably such sampling occurs after read-out at 53 and prior to supply of injecting pressure to the hydraulic means 18, so that correction at 40 takes place before injection on the next-succeeding cycle for which a read-out is taken at 53. Of course, the sampling interval of relay 75 should be sufficiently great to allow adequate response at 73–74 for a predetermined incremental displacement of the adjustment means 40.

FIG. 3 illustrates graphically the general relation of significant variables as a function of time, in operation of my invention. The legend $P_S$ designates a predetermined pressure level to be monitored in the pressure melt, as by the cavity transducer 33. For the FIG. 1 arrangement, the level $P_S$ is set by adjusting knob 57 to cause the upper operating threshold $P_A$ (at 55) and the lower operating threshold $P_B$ (at 56) to straddle the level $P_S$; for the FIG. 2 arrangement, the level $P_S$ is set by adjusting knob 72. The solid heavy-line curve typifies events in plastic pressure development in the mold cavity 17; commencing with the application of injection pressure at 18. The initial jagged portion 80 of this curve reflects erratic melt-pressure build-up as the cavity 17' is filling, until time $T_1$, when the cavity is filled. Thereafter, the curve rises swiftly at portion 81 to its crest 82, which is reflected as the peak voltage stored at 52, for subsequent read out and evaluation.

The dashed-line curve connotes plasticizing-screw location as a function of the same time scale, being characterized by a rapid-advance portion 83 as the mold cavity is filling, by a level plateau 84 as the injected material is allowed to cure under pressure, and by a gradual retreat 85 after motor 14 is restored to generate a new charge of melt. The down slope 85 will be understood to commence substantially at completion of cure, being designated $T_2$, when the down slope 86 of the cavity-pressure curve substantially returns to zero; the down slope 85 returns to zero when motor 14 is shut off upon completion of a fresh melt generation.

If the pressure transducer 84 should have been selected for operation of the control system of FIG. 1, then the dot-dash curve 87 of FIG. 3 would be typical, for a monitoring of melt pressure at the nozzle 16. Typically, this curve rises smoothly while the cavity is filling; it then begins to level-off, with a "knee" which may be smooth or erratic depending upon the contour complexity of the cavity 17'. Upon completion of cure ($T_2$), the elevated hydraulic pressure is reduced (by means 20–23) to the "loading" level 88 desired for generation of the new melt. Typically, the elevated or injection pressure is in the order of 12,000 to 15,000 p.s.i., and the reduced or "loading" pressure is in the order of 1,000 p.s.i.

It will be seen that the invention achieves the stated objects and provides for improved consistency of product quality, with minimum waste of material and machine time. Simple manual adjustment permits the operator to select his reference pressure, against which all product melt pressures are subsequently evaluated, there being instant corrective action as soon as departure from the desired standard is detected.

Although the invention has been described in detail for preferred general arrangements, much has been intentionally schematic in that alternative structure and modifications are available within the scope of the claimed invention. Moreover, such schematic showings as the lower operating and shut-down threshold circuits 56–64 will be understood to include such inverters, biasing devices and the like as to provide the lower-threshold functions attributable to them; such techniques will be understood to be within the skill of the art.

What is claimed is:

1. In the method of molding plastic parts by cyclically injecting a quantity of plasticized melt into a mold, conditioning the plasticized melt to make it harden to a solid article, and ejecting the article from the mold the improvement which comprises: detecting in a first cycle the peak pressure of plasticized melt within the mold, evaluating the detected peak pressure against a predetermined reference pressure, said reference pressure corresponding to the peak plasticized melt pressure resulting in articles of high quality and consistency, and utilizing the evaluated difference between detected peak pressure and said predetermined reference pressure to adjust the injection force operative upon a succeeding injection of plasticized melt into said mold as will result in substantially said predetermined peak pressure therein.

2. In the method of molding plastic parts by cyclically injecting a quantity of plasticized melt into a mold, conditioning the plasticized melt to make it harden to a solid article, and ejecting the article from the mold the improvement which comprises:
   (a) detecting the peak plasticized melt pressure within the mold during one cycle wherein an article of high quality is produced;
   (b) storing the peak plasticized melt pressure data;
   (c) detecting in a succeeding cycle the peak plasticized melt pressure within the mold;
   (d) evaluating the difference between said peak plasticized melt pressures; and
   (e) utilizing the evaluated difference between said peak plasticized melt pressures to adjust the injection pressure to produce a peak plasticized melt pressure within the mold during a succeeding cycle which is substantially the same as said peak plasticized melt pressure detected within the mold during one cycle wherein an article of high quality is produced.

References Cited
UNITED STATES PATENTS

| | | | |
|---|---|---|---|
| 2,786,234 | 3/1957 | Beyer | 425—149 X |
| 2,256,798 | 9/1941 | Yeakel | 425—150 |
| 2,455,823 | 12/1948 | Tauber et al. | 425—150 |
| 3,604,075 | 9/1971 | Locke et al. | 425—167 X |

ROBERT F. WHITE, Primary Examiner

J. H. SILBAUGH, Assistant Examiner

UNITED STATES PATENT OFFICE
CERTIFICATE OF CORRECTION

Patent No. 3,792,134          Dated February 12, 1974

Inventor(s) Donald C. Paulson

It is certified that error appears in the above-identified patent and that said Letters Patent are hereby corrected as shown below:

<u>In The Specification:</u>

Column 3, line 33, delete "in" and substitute therefor --is--.

Column 3, line 50, delete "transducer" and substitute therefor --transducers--.

Column 4, line 5, delete "50" and substitute therefor --53--.

Column 4, line 56, delete "presence" and substitute therefor --pressure--.

Column 5, line 15, delete "injecting" and substitute therefor --injection--.

Column 5, line 46, delete "restored" and substitute therefor --restarted--.

Column 5, line 53, delete "84" and substitute therefor --34--.

Signed and sealed this 30th day of July 1974.

(SEAL)
Attest:

McCOY M. GIBSON, JR.          C. MARSHALL DANN
Attesting Officer              Commissioner of Patents